3,195,973
N-METHYLOLATED DIAMINO-DIHYDROXYAN-
THRAQUINONES, MIXTURES THEREOF AND
THEIR PRODUCTION
Otto Fuchs and Heinz Rentél, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 24, 1961, Ser. No. 98,023
Claims priority, application Germany, Apr. 2, 1960,
F 30,900; Mar. 2, 1961, F 33,327
12 Claims. (Cl. 8—25)

The present invention provides new dispersion dyestuffs and a process for their manufacture; more particularly it provides new dispersion dyestuffs having the general formula

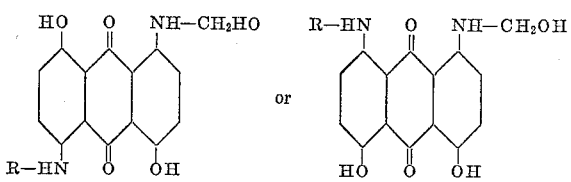

wherein R represents a hydrogen atom or a methylol group, and mixtures of these dyestuffs.

The invention is based on the observation that new dispersion dyestuffs having the general formula

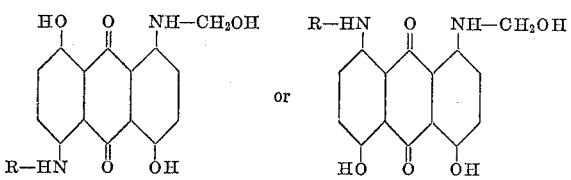

wherein R represents a hydrogen atom or a methylol group, or mixtures of these dyestuffs may be prepared by reacting, at a temperature in the range from about −20° C. to 70° C., preferably in the range from about 20° C. to 50° C., 1 mol of 4.8-diamino-1.5-dihydroxyanthraquinone or 4.5-diamino-1.8-dihydroxyanthraquinone or 1 mol of a mixture of these two dyestuffs in solution of sulfuric acid with about 0.5 mol to 2 mols of formaldehyde, if desired in the presence of phosphorus pentoxide, polyphosphoric acid, aliphatic carboxylic acid amides, in which one hydrogen atom on the nitrogen atom may be substituted by an alkyl group, or mixtures of these compounds, in which reaction these compounds or the mixtures thereof are used in an amount of about 25% to 100% by weight calculated on the dyestuff or the dyestuff mixture used. The formaldehyde may be used in the form of a polyhydroxymethylene, advantageously as paraformaldehyde or trioxane. As aliphatic carboxylic acid amides which may be added there are preferably used the amides of saturated aliphatic carboxylic acids containing 1 to 5 carbon atoms.

The reaction is advantageously carried out such that the aforesaid starting dyestuffs or the mixtures thereof are dissolved, at a moderate temperature, for example at a temperature in the range from about 30° C. to 50° C., in concentrated to weakly fuming sulfuric acid and that formaldehyde, advantageously in the form of paraformaldehyde and, as far as the reaction takes place in the presence of the aforesaid additional compounds, these additional compounds, if desired dissolved in concentrated to weakly fuming sulfuric acid, are added to the above dyestuff solutions obtained, at a temperature in the range from about −20° C. and +70° C., preferably in the range from about 20° C. to 50° C. After the reaction being carried out, the reaction mixture obtained is slowly poured onto ice, the precipitated dyestuff is filtered off and washed until neutral. By carrying out the reaction at temperatures above 70° C. or below −20° C., products of poorer tinctorial strength are obtained.

With regard to their intended use, the dyestuffs or dyestuff mixtures thus obtained are converted into a finely dispersed form according to usual methods, advantageously by adding dispersing agents and wetting agents. The new dyestuffs are water-soluble only to a very small degree. In most organic solvents, however, they dissolve giving a clear blue tint.

The new dyestuffs dye fibers and foils of synthetic material, for example of polyamides, cellulose acetate and cellulose triacetate blue tints. The new dyestuffs show an especially marked affinity to structures of aromatic polyesters, such as polyethylene terephthalates. While, with the above-mentioned diamino-dihydroxyanthraquinones used as starting products on aromatic polyester fibers only weakly reddish-blue dyeings are obtained, the dyestuffs or dyestuff mixtures prepared according to the process of the present invention show an excellent affinity to the substratum mentioned. They dye fabrics of aromatic polyester fibers deep clear blue tints, both at temperatures of about 100° C. in the presence of a carrier and at temperatures of about 120° C. in the absence of a carrier.

The dyeings or prints obtained with the new dyestuffs on fibers or foils of synthetic materials, particularly of polyethylene terephthalates are distinguished by their very good fastness to light, to hot pressing, to rubbing and to solvents and by their good fastness to hot air fixation and to washing.

The following examples serve to illustrate the invention but they are not intended to limit it thereto, the parts being by weight:

*Example 1*

14 parts of 4.8-diamino-1.5-dihydroxyanthraquinone were dissolved, at 40° C., in 68 parts of sulfuric acid monohydrate; the solution was allowed to cool somewhat and, while stirring, 1.5 parts of paraformaldehyde were introduced in portions such that the temperature did not exceed 35° C. Subsequently, the whole was stirred for another 4 to 10 hours, at 30° C. to 35° C., and finally the reaction product was carefully poured onto ice. The precipitate was filtered off and washed until neutral. After drying, 14.5 parts of a blue dyestuff were obtained. For fine dispersion, it was suitable not to use the dried product but the humid filter cake which, in the presence of dispersing agents, was ground to a fine dispersion.

The aqueous dispersion of the dyestuff dyed a fabric of polyethylene terephthalate fibers deep blue tints. The dyeing obtained possesed an excellent fastness to light.

*Example 2*

27 parts of 4.5-diamino-1.8-dihydroxyanthraquinone were dissolved, at 40° C., in 136 parts of oleum of 5% strength and, while stirring, 4.5 parts of paraformaldehyde were introduced such that the reaction temperature was 45° C. to 50° C. Subsequently, the whole was stirred for some hours at this temperature and finally the reaction product was carefully poured onto ice. The precipitate obtained was filtered off and washed until neutral.

While working as described in Example 1, an aqueous dispersion was obtained which dyed foils of polyethylene terephthalate deep reddish-blue tints. The dyeing obtained possessed an excellent fastness to light.

*Example 3*

27 parts of a mixture containing 45 parts of 4.8-diamino-1.5-dihydroxyanthraquinone and 55 parts of 4.5-diamino- 1.8-dihydroxyanthraquinone were dissolved, at 40° C., in 136 parts of oleum of 3% strength; the whole was allowed to cool somewhat and, while stirring, 3 parts of paraformaldehyde were introduced in portions, at 30° C. to 35° C., into the yellowish-brown solution obtained. Subsequently, the whole was stirred for another 4 to 10 hours at this temperature and finally the reaction product was poured carefully onto ice. The precipitate obtained was filtered off and washed until neutral.

When dyeing fabrics of polyamide, triacetyl cellulose or polyethylene terephthalate fibers with an aqueous dispersion of this dyestuff, deep blue dyeings of excellent fastness to light were obtained.

*Example 4*

64 parts of a mixture containing 55 parts of 4.8-diamino-1.5-dihydroxyanthraquinone and 45 parts of 4.5-diamino-1.8-dihydroxyanthraquinone were dissolved, at 40° C., in 280 parts of monohydrate and subsequently 6 parts of paraformaldehyde were introduced, at 30° C. to 35° C., while vigorously stirring. After a reaction time of 8 hours, further 6 parts of paraformaldehyde were introduced and the whole was stirred for another 6 to 8 hours. Subsequently, the reaction mixture was carefully poured onto ice, filtered off and washed until neutral.

The aqueous dispersion of the isolated dyestuff dyed a fabric of polyethylene terephthalate fibers greenish-blue tints.

*Example 5*

27 parts of a mixture of 55 parts of 4.8-diamino-1.5-dihydroxyanthraquinone and 45 parts of 4.5-diamino-1.8-dihydroxyanthraquinone were dissolved, at 40° C., in 100 parts of sulfuric acid monohydrate; the whole was allowed to cool and, while stirring, a mixture previously prepared from 100 parts of sulfuric acid monohydrate, 3 parts of paraformaldehyde, 5 parts of phosphorus pentoxide and 20 parts of N-methylacetamide was introduced, at 30° C., to 35° C., into the solution obtained. Subsequently, the whole was stirred at this temperature for another 4 to 10 hours and finally the reaction mixture was carefully poured onto ice. The precipitate obtained was filtered off and washed until neutral.

By dyeing at 100° C. in the absence of a carrier, a fabric of polyethylene terephthalate fibers with an aqueous dispersion of this dyestuff, deep blue dyeings possessing an excellent fastness to light were obtained.

*Example 6*

27 parts of 4.8-diamino-1.5-dihydroxyanthraquinone were dissolved, at 40° C., in 100 parts of sulfuric acid monohydrate; 10 parts of polyphosphoric acid were added and, subsequently, 3 parts of paraformaldehyde were introduced, at 30° C., while stirring. The whole was stirred for another 8 hours, at 30° C. to 35° C., and subsequently the reaction mixture was carefully poured onto ice. The dyestuff obtained was filtered off and washed until neutral.

In the form of an aqueous dispersion the dyestuff dyed fabrics of polyethylene terephthalate fibers deep blue tints, both at 120° C. under pressure in the absence of a carrier and at 100° C. in the presence of a carrier.

We claim:

1. Dispersion dyestuffs having a formula selected from the group consisting of the two formulae

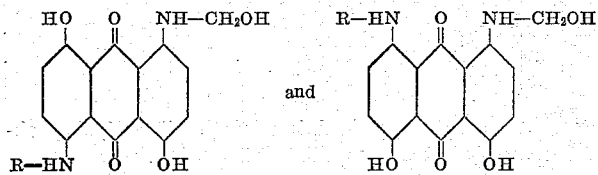

and mixtures thereof, wherein R represents a member selected from the group consisting of a hydrogen atom and a methylol group.

2. The dispersion dyestuff having the formula

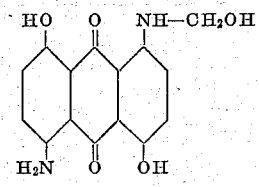

3. The dispersion dyestuff having the formula

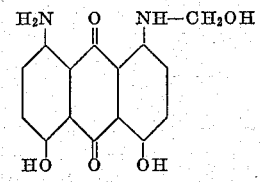

4. The dispersion dyestuff having the formula

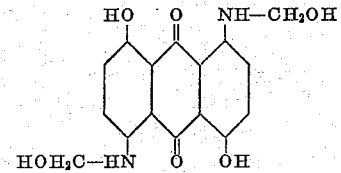

5. The dispersion dyestuff consisting of a mixture of the dyestuffs having the formulae

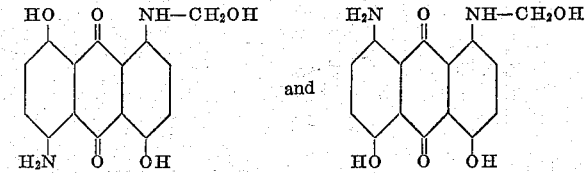

6. The dispersion dyestuff consisting of a mixture of the dyestuffs having the formulae

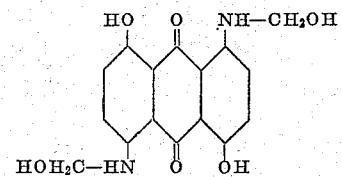

and

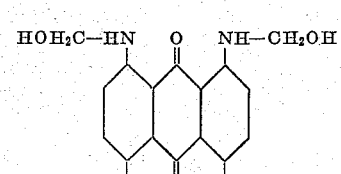

7. The process for the manufacture of dispersion dyestuffs having a general formula selected from the group consisting of

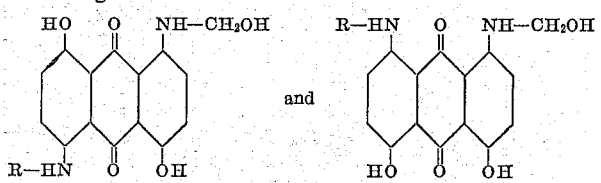

and mixtures thereof, wherein R represents a member selected from the group consisting of a hydrogen atom and a methylol group, which comprises reacting 1 mol of a member selected from the group consisting of 4.8-diamino-1.5-dihydroxyanthraquinone and 4.5-diamino-1.8-dihydroxyanthraquinone and mixtures thereof in concentrated to weakly fuming sulfuric acid with 0.5 to 2 mols of formaldehyde at a temperature in the range from about −20° C. to 70° C.

8. The process as claimed in claim 7, wherein the reaction is carried out at a temperature in the range from about 20° C. to 50° C.

9. The process as claimed in claim 7, wherein the reaction is carried out in the presence of a compound selected from the group consisting of phosphorus pentoxide, polyphosphoric acid and a N-monoalkyl-substituted aliphatic carboxylic acid amide having from 1 to 5 carbon atoms, and mixtures thereof, in an amount of 25% to 100% by weight calculated on the dyestuff used.

10. A process as claimed in claim 7, wherein the reaction is carried out in the presence of polyphosphoric acid in an amount of 25% to 100% by weight calculated on the dyestuff used.

11. A process as claimed in claim 7, wherein the reaction is carried out in the presence of phosphorus pentoxide and N-methylacetamide in an amount of 25% to 100% by weight calculated on the dyestuff used.

12. A process as claimed in claim 7, wherein paraformaldehyde is used.

References Cited by the Examiner

UNITED STATES PATENTS

| | | | |
|---|---|---|---|
| 2,368,681 | 2/45 | Seymour et al. | 260—379 X |
| 2,443,899 | 6/48 | Erkkila et al. | 260—380 X |
| 2,485,187 | 10/49 | Grossmann | 8—25 |
| 2,651,641 | 9/53 | Straley | 260—38 |
| 2,830,062 | 4/58 | Lodge. | |

FOREIGN PATENTS

| | | |
|---|---|---|
| 244,462 | 5/27 | Great Britain. |
| 183,384 | 6/36 | Switzerland. |
| 1,076,856 | 3/60 | Germany. |
| 842,802 | 7/60 | Great Britain. |

OTHER REFERENCES

Broden: American Dyestuff Reporter, Jan. 4, 1954, pp. 6–13.

Venkataramann: Synthetic Dyes, pp. 597–599, published 1952 by Academic Press Inc.; published in New York city.

NORMAN G. TORCHIN, *Primary Examiner*.

CHARLES B. PARKER, MORRIS O. WOLK, A. LOUIS MONACELL, *Examiners*.